United States Patent [19]
Clarke

[11] Patent Number: 4,789,276
[45] Date of Patent: Dec. 6, 1988

[54] TWIST DRILL FOR TOUGH PLASTICS
[75] Inventor: Roger S. Clarke, Evansville, Ind.
[73] Assignee: Diversified Electronics, Inc., Evansville, Ind.
[21] Appl. No.: 93,375
[22] Filed: Sep. 4, 1987
[51] Int. Cl.[4] ............................................... B23B 51/02
[52] U.S. Cl. .................................................... 408/230
[58] Field of Search ................................. 408/230, 715
[56] References Cited
U.S. PATENT DOCUMENTS
2,859,645 11/1958 Emmons et al. ..................... 408/230

Primary Examiner—Eugene F. Desmond
Attorney, Agent, or Firm—Robert R. Keegan

[57] ABSTRACT

There is disclosed a twist drill particularly adapted for drilling plastics and composite materials having a sharp point angle, typically 85° to 95°, and a very low lip relief angle, typically 2° to 3°; the relief surfaces are broad, though not unusually so, and may each subtend an angle of 40° to 60° about the drill longitudinal axis. A two-flute drill is shown, but the structure may be modified to provide three or more flutes. Land width, helix angle, and other attributes of the twist drill are generally similar to most common varieties of twist drills for steel, wood, or other uses in drill presses or hand drills.

26 Claims, 1 Drawing Sheet

TWIST DRILL FOR TOUGH PLASTICS

The present invention relates to drills for making smooth and accurate holes required in manufacturing operations or the like, and particularly to drills suitable for tough plastic materials. There is a profusion of variations in the generic class of twist drills, of which class the present invention is a member.

The generic class of twist drills is characterized by a hard metal tool of generally elongated cylindrical shape with a smooth shank at one end and the greatest portion of its length shaped into helical flutes separated by helical lands designed to transport the removed material away from the cutting surface and out of the hole as the drill rotates.

The cutting end opposite the shanked end is generally conical and the flutes (usually two in number) extend through the conical end and are bordered on one side by a cutting (or chisel) edge. Details of such drills will be better understood from the detailed explanation of the drawings.

Inadequacies of wood or metal drills of common design in drilling plastic materials have long been known, but solutions proposed heretofore have had drawbacks which are overcome in a distinctive manner with twist drills according to the present invention.

Plastics and composite materials have become extremely important in all fields of manufacturing, and applying known simple twist drills to produce accurate smooth round holes in such materials, as often required, has encountered one difficulty in particular. This is the tendency of a standard, conventional twist drill to "pig in" plastic type materials. This tendency to "pig in" can best be described as a tendency to rip and screw into the tough plastic without cutting a circular hole. Particularly in thin plastic, this action produces a strong pulling force as the bit advances into the plastic at a greater rate than the cutting edges can successfully remove in a half revolution. The result will often be a jagged hole which tends to ride up on the helical flutes of the drill.

In addition to slowing production and causing unsatisfactory results and rejected work products, there is a safety hazard when work pieces are violently grabbed by the rapidly rotating drill. Accordingly the inadequacies of simple twist drills of known conventional design have essentially required that a drilling jig (device to hold the workpiece) be used to drill thin tough plastic such as Lexan where the guide bushings tend to act as shearing holes when the plastic is cut and drawn through too quickly. Conventional twist drills were incapable of drilling such stock by ordinary handheld means.

The key to the improvements of the present invention is the discovery that the combination of a relatively sharp or narrow point angle of about 90° together with an unusually small lip relief angle (from 1° to 4°) provides vastly improved performance in drilling tough plastics, substantially eliminating the tendency to "pig in" and grab or tear the work material rather than smoothly cutting it away.

Although some theory of the operation of the device is presented as an aid to understanding, the efficacy of twist drills having the features of the present invention is not based upon the theory of operation, but rather on actual performance and comparison with conventional drill designs.

It should be pointed out that there are drills which can generally be characterized as twist drills that are of more complicated and expensive construction such as the so-called "brad point" drill. In addition to a center point which acts primarily as a pivot, brad point drills have spur points on the periphery which produce a scoring or cutting action essentially perpendicular to the surface of the work and extending around the periphery of the hole being cut. It is to be understood that such spur points are not present and are not required on twist drills according to the present invention.

There are other more complicated and expensive types of drills which are also characterized by a cutting blade or a spur cutting along a line perpendicular to the surface of the work (parallel to the axis of the drill) and moving peripherally around the hole being cut. In addition to being far more expensive, these more complicated drills are not easily sharpened, if at all, and have other drawbacks not present in the simple twist drill configuration.

There are countless varieties of drills which have been devised for various purposes, some of which might be characterized twist drills and others which would not. It goes without saying that isolated features in the combination of the present invention will be found in previous forms of drills. No previous drill has been found, however, which combines the features responsible for the notable advantages of the present invention. U.S. Pat. No. 4,189,013 issued to Adams et al, Feb. 19, 1980, U.S. Cl 175/320 is not a twist drill in the usual sense of the term and in numerous characteristics differs from twist drills according to the present invention. It does make reference, however, to a "relief angle of about 8° to about 12°", column 1, line 61; this is a relief angle less than usually found even though considerably removed from the preferred relief angles for most variations of the present invention. It is less than abundantly clear what angle of arc the relief surface of Adams et al subtends about the drill axis; it appears that angle B is not the arc subtended by the relief surface but is rather "the segment of the circle that one of the third surfaces forms at its upper edge" column 4, lines 32 and 33. In any event the configuration and the function of the drill disclosed by Adams et al is not such as to suggest very low relief angles as proposed by the present invention in conjunction with sharp point angles, which are definitely not disclosed by Adams et al.

U.S. Pat. No. 2,936,658 to O. L. Riley issued May 17, 1960, U.S. Cl 77-70 has a reference to a small angle (called primary clearance) of from 2½° to 8°. This appears to refer to the surface immediately behind the cutting edge of a twist drill, but the surface at this 2½° to 8° angle is very narrow and subtends at most an angle of a few degrees about the drill axis. A trailing part of what would be referred to herein as the relief surface is referred to by Riley as a secondary clearance and is "inclined from 20° to 45° from a line S normal to the axis of the drill". Column 2, lines 50-51. It is believed that the secondary clearance, so called, of Riley is more comparable to the lip relief surface of the present invention and, as seen above, the angle of this surface is from 20° to 45°, larger than most prior art devices.

Commercially available drills or those shown in prior patents and publications have not been found to include the combination of features responsible for the markedly improved performance for plastic drilling exhibited by the drills according to the present invention, and this is particularly true with a respect to combination of a wide relief surface with a very small lip relief angle together with a sharp point angle.

It should be appreciated that in the manufacture of twist drills the "blank" for the drill is mass produced in a separate operation and a particular cutting tip geometry for the drill is achieved by grinding the tip. Additional heat treating or hardening of the drill may or may not be conducted after the tip grinding (or after subsequent regrinding for sharpening). While twist drills are commonly double flute configurations, blanks with other numbers of flutes could be utilized to make twist drills according to the invention. The present invention relates almost exclusively to the improved cutting tip geometry rather than the helix configuration of the drill. Of course, the helix configuration is important because it provides the structure from which the cutting tip geometry is shaped by grinding. It is not contemplated that any shaping of the cutting tip will be done other than by removing material. That is to say there is no deformation of the existing twist drill blank, only removal of material. Desiderata for twist drill blanks such as hardenability, heat conductivity, durability, and ruggedness that apply to conventional twist drills are also generally applicable to the twist drill blanks for the present invention.

No detailed investigation of the theoretical basis for the improvements provided by the present improved twist drill cutting tip geometry have been made. It is believed that the unusually low lip relief angle is a deterent to the possiblity of the cutting edge of the twist drill advancing at an angle higher than desired with resulting removal of material of a thickness and volume that cannot be handled by the overall twist drill configuration. However, that objective achieved by the low lip relief angle is somewhat contradictory to the sharp point angle which would appear to permit the cutting edge to advance more rapidly than a wider or larger conventional point angle.

It is known that plastic has very low heat dissipation capability and it is possible that the novel cutting tip geometry of the present invention owes a part of its efficacy to improved heat dissipation through the twist drill. No detailed investigation of this possibility has been made however.

In addition to providing the features and advantages described above it is an object of the present invention to provide a twist drill with an improved cutting tip geometry which alleviates or eliminates the necessity for securely clamping a workpiece, particularly in the case of thin materials and moderate to large hole drilling.

It is another object of the present invention to provide a twist drill for plastic materials which has a simple configuration of the cutting tip geometry which is not difficult or expensive to manufacture, and at the same time provides great advantages in producing clean, round holes in thin plastic stock.

It is still another object of the present invention to provide a twist drill manufactured from a conventional blank with a novel cutting tip geometry particularly adaptable to drilling plastic materials and provides the capability of drilling moderate to large holes in thin plastic stock with a hand tool and without the use of a drilling jig, operations that are virtually impossible with a conventional simple twist drill bit.

Other objects and advantages of the invention will be apparent from consideration of the following description in conjunction with the appended drawings in which.

Figure 1:
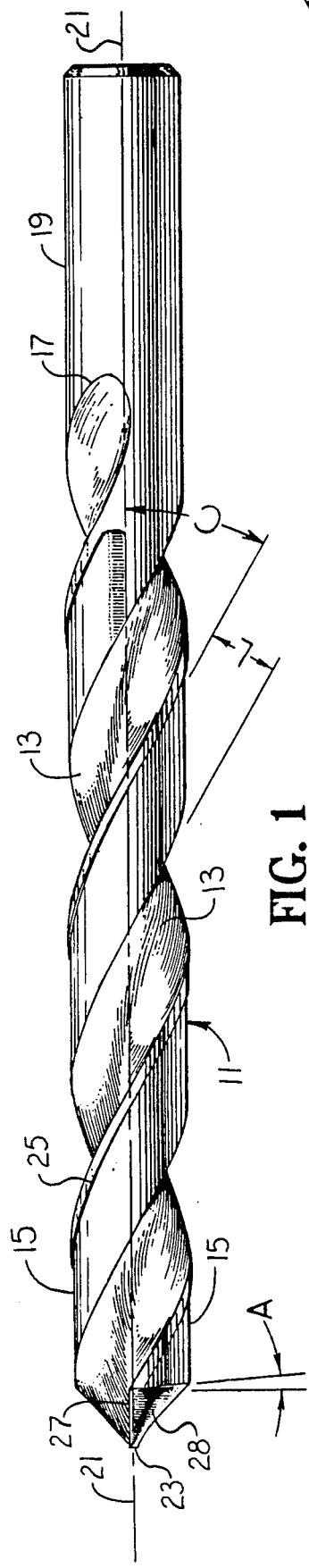
FIG. 1 is an enlarged side elevational view of a twist drill according to the present invention.

Referring now to the drawings, and particularly to FIG. 1, a twist drill 11 configured in accordance with the present invention is shown. It may be formed from a generally conventional twist drill blank having helical flutes 13 defined by lands 15 shaped from body of the twist drill between the flutes. A twist drill blank will have a land width indicated by L in FIG. 1 and a helix angle indicated by C in FIG. 1. The helix angle will be defined as the angle made by the leading edge of the land with a plane containing the axis of the drill indicated by dot-dash line at 21. The land widths and helix angles for drills according to the present invention are generally not critical and the values for these parameters may vary considerably. Exemplary values will be described hereinafter.

As customary there is a flute termination 1 and a shank portion 19 of the twist drill 11 adapted to be secured in a chuck of a drill press, hand drill, or the like. As seen, particularly in FIG. 2 the illustrated drill has two flutes 13 and two lands 15; a web 22 joins the two lands 15 and the extreme end of the web forms a chisel edge 23 on a two-flute drill. The land thickness indicated at K is also generally conventional in the drill of the present invention. A portion of the land 15 is cut away to provide clearance and the remaining portion is referred to as the margin 25.

Figure 2:
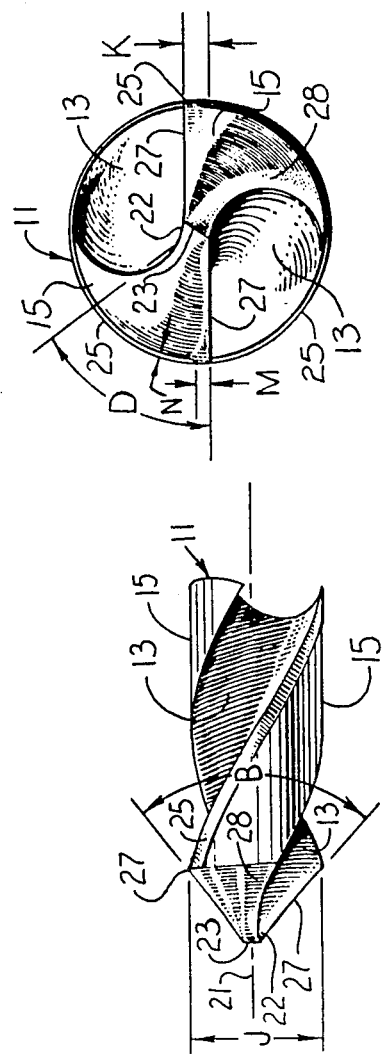
FIG. 2 is an end elevational view thereof.

The clearance, measured as the difference between the drill diameter and the body clearance diameter is about 5% of the drill diameter and is also a non-critical dimension, the clearance is indicated at N in FIG. 2. The cutting function of the twist drill takes place primarily at the lips 27 extending from near the center of the drill at the chisel edge 23 to the outer periphery of the drill. In referring to the diameters of drill portions is should be understood that some twist drill blanks may have a slight taper amounting to a few thousandths of an inch at most.

The point angle of the drill is indicated at B and it is the angle included between the cutting lips. This angle is properly measured projected on a plane parallel to (or containing) the drill axis and parallel to the two cutting lips. In twist drills according to the present invention the point angle is typically about 90°, and this angle is substantially smaller than point angles generally found in twist drills.

A principal distinctive feature of twist drills according to the present invention is the very small lip relief angle indicated at A in FIG. 1 which may typically be from 2° to 3°. Lip relief angles in twist drills for wood or metal drilling, or for drilling in plastic, are commonly 10° or more. Note that the relief surface extends around an arc of about 60° centered on the drill axis. While one could measure an angle behind the cutting edge of a flat blade type wood boring tool, the narrow blade end does not act as a relief surface and such angle is not considered a lip relief angle in this discussion. In practical terms the relief surface 28 should fall away behind the lip 27 rather than being flush in the bottom of a conical hole. This demands a relief angle greater than 0°. The lip relief angle A will be defined as the complement of the angle made by the outer portion of the relief surface with a plane containing the axis of the twist drill; the inner portion of the relief suface merges into the chisel point and thus will not have a well defined relief angle. It may be desirable for the lip relief angle to gradually increase toward the center of the drill; however, grinding the most desirable shape may be impractical, and the advantages of the invention will be achieved if an outer portion of the relief surface approximates the optimum lip relief angle. The relief angle is customarily specified as the complement of the angle with an axial plane (i.e. angle with a normal to such plane) rather than the angle itself as in the case of the helix angle.

With a point angle of 90°, for example, it has been found that twist drills according to the present invention with a lip relief angle of from 2° to 3° are remarkably more effective in producing clean holes in tough plastics without a tendency to grab, tear, or gouge the work. The advantage of drills according to the invention is most notable when used in hand drills and/or where the work is not readily adapted to being claimped or securely held. Conventional drills in such a case often gouge into the plastic sheet being drilled particularly if it is thin stock such as 1/16 of an inch or less. This often results in the drill screwing into the stock to form a jagged hole and causing the workpiece to advance up the drill. In contrast, drills according to the present invention have virtually no tendency to grab or gouge into the work even when the work is hand held and/or drilled with a hand drill.

The speed of drilling with drills according to the present invention compares favorably with conventional drills with high lip relief angles, assuming that such conventional drills are able to drill a clean hole without tearing the workpiece. If the presence of burrs in the finished hole is a consideration, drills according to the present invention are vastly superior in producing burr-free holes which require no further step for deburring as would be the case with conventional drills.

Durability of drills according to the present invention (and other drills as well) depends on the material of which they are made and the hardening treatment which may be employed. Other things being equal, drills according to the present invention are believed to be at least as durable, in terms of the number of acceptable holes made before resharpening, as are conventional drills. Of course, the quality of holes made with drills of the present invention while sharp or moderately sharp would be much superior to conventional drills.

It should be noted that the particular drill configuration illustrated is shown by way of example and to present the novel features of sharp point angle B and very low lip relief angle A as applied to a particular drill embodiment. It will be understood that there is substantial variation in twist drills and twist drill blanks, and that for the most part they may all be modified with the features of the present invention advantageously. By way of example, split point twist drills as shown in U.S. Pat. No. 4,456,347 issued Dec. 3, 1985 to Herman B. Barish, U.S. Cl 408/230 could be adapted to have the features of the present invention to advantage.

It has been observed, as might be expected, that slightly different drill configurations are optimum for different drilling speeds. For example, a common ⅜ inch hand drill with speed of 1,350 RPM drilling 1/16 inch Lexan plastic was found to perform moderately better with a twist drill of relief angle of 2° as compared with a relief angle of 3°. On the other hand, drilling at the typically lower speed of a ½ inch hand drill (650 RPM) a relief angle of 3° for the drill performed slightly better than 2°. It may be said that a general purpose configuration of about 90° point angle and about 2° relief angle would be best.

While the optimum lip relief angle appears to lie between 2° and 3° in most instances, it will be appreciated that some of advantages of the invention will accrue for relief angles substantially greater than 3°, and angles greater than 3° may be selected for the other reasons, and/or when the particular operation does not require the optimum anti-grabbing characteristics for the drill.

Presented below is a table showing variations in twist drill parameters which may be employed to suit particular needs. Insufficient information exists to make any distinction between various tough plastic compositions or to prescribe certain twist drill parameters for use with certain plastics. In general the preferred forms of twist drills according to the invention will be suitable for tough plastic such as Lexan, ABS, PVC, UHMW, Nylon, or polystyrene. In addition the drills may be used on composite materials of plastic with reinforcing fiber or filling of other materials. Furthermore, the drills may be found useful in certain soft metals. Of course, twist drills according to the invention will drill wood and metal and exhibit advantageous characteristics, but without any all-inclusive advantage over other forms of drills. Nonetheless it is convenient to be able to drill laminated material, e.g. metal-plastic laminate with these drills.

The rationale for perdicting suitability of materials for drilling with twist drills according to the invention relates to the flexibility and resilience of such materials. Materials which tend to flex or distort under drilling are prefered for the invention. In the case of the conventional drill, the advancing cutting edges may not cut material at an even rate as allowed by the large relief angle. If the amount being drawn into the spiral flutes becomes excessively thick, the material that is recently cut and is close to the cutting edge can distort and draw in the connecting material that is just ahead of the cutting edge presenting even a thicker amount of material for the cutting edges to encounter. This effect is usually worse for thin material since it can be more easily flexed and can lead to the drill "pigging-in". Deformation of material is of most concern at the drill periphery where the linear speed is greatest, the potential gouging angle is greatest, and material removed is adjacent material that will be forming the edges and sides of the hole.

Other thermoplastic resins may be considered candidates for use of the improved drills of the invention such as halocarbon resins, polyacrylates, polyamide resins, vinyl acetate resins, vinyl choloride resins, acrylic resins, cellulose esters, cellulose ethers, polyester resins, polyether resins, polyurethane resins, vinyl resins and vulcanized elastomers. The improved drill of the present invention may also be applied to drill thermosetting resins such as amino resins, melamine resins, phenolic resins, urea resins and diene resins.

TABLE 1

|  | A deg. | B* deg. | C** deg. | D** deg. | J inches | K % Diam | L** % Diam | M % Diam | N % Diam |
| --- | --- | --- | --- | --- | --- | --- | --- | --- | --- |
| Best 1350 RPM | 2° | 90° | 24–34° | 40–60° | ⅛″–1″ | 14–17% | 62–64% | 9–11% | 4–6% |
| Best 650 RPM | 3° | 90° | 24–34° | 40–60° | ⅛″–1″ | 14–17% | 62–64% | 9–11% | 4–6% |
| General Purpose | 2–3° | 85–95° | 30° | 40–60° | ⅛″–1″ | 14–17% | 55–70% | 5–15% | 3–8% |
| Special Purpose | 1½–4½° | 75° | 35° | 30–50° | — | — | — | — | — |
| Common Variation | 1°–5° | 75–95° | 24°–30° | 40–80° | ⅛″–1″ | 12–19% | 55–70% | 5–15% | 3–8% |
| Usable Range | 1°–9° | 60–118° | 20°–40° | 30°–90° | 1/32″–2″ | 12–19% | 45–70% | — | 2–8% |

*Any advantage for angles of less than 90° must be balanced by limited availability of grinding and sharpening machines capable of handling less than 90° angles.
**For 2-flute drill. Adjust for greater number of flutes.
A. Lip Relief Angle
B. Point Angle
C. Helix Angle
D. Relief Surface Angle
J. Diameter
K. Web Thickness
L. Land Width
M. Margin Width
N. Body Clearance As noted in Table 1 above and in FIG. 2 relief surface 28 behind the cutting edge of lip 27 is broad and subtends a substantial angle D about drill axis 21. This large area surface with a low lip relief angle provides a different function than a narrow band behind the cutting edge as found in flat-blade wood drills or in drills with two different "relief angles" as disclosed by Riley in U.S. Pat. No. 2,936,658, for example. It can be intuitively understood that the wide, low angle lip relief surface 28 inhibits very rapid progress of the drill into the work. Of course, this is thought to be a main consideration in the anti-grabbing properties of twist drills according to the present invention. This does not preclude contributions from other effects which are not fully understood. It is also not thoroughly understood how the point angle of about 90° or less, much sharper than customary, combines with the low relief angle to achieve results much better than would be expected.

Figure 4:
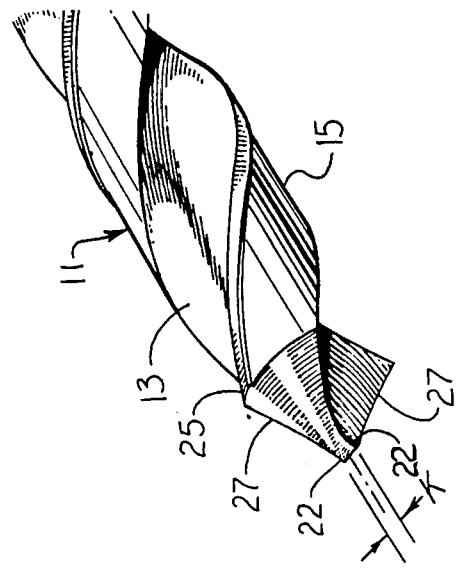
FIG. 4 is an isometric view thereof.
Figure 3:
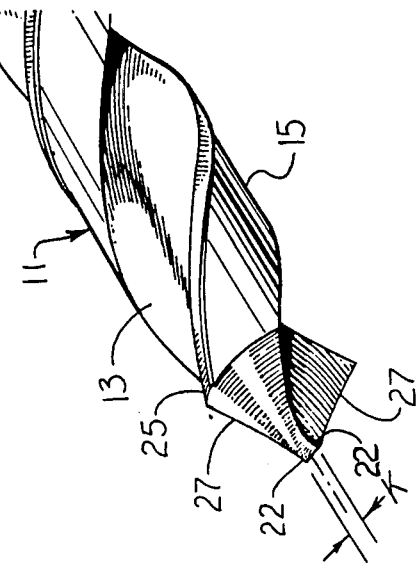
FIG. 3 is a top plan view thereof.

FIG. 3 is a view of the end of the twist drill of FIG. 1 rotated so that the lips 27 are approximately in the plane of the paper thereby better showing the point angle B. FIG. 4 is an isometric view of the end of the twist drill of FIG. 1 showing its overall configuration.

In addition to the variations and modifications of the twist drills according to the present invention which are shown or suggested above, other variations will be apparent to those skilled in the art and accordingly the invention is not to be considered limited to those embodiments described or suggested, but is rather to be determined by reference to the appended claims.

What is claimed is:

1. A twist drill having a longitudinal axis, a point angle from 75° to 95°, at least two relief surfaces each extending through an arc of at least 30° about said axis, and a lip relief angle for said relief surface from about 2° to about 3°.

2. A drill as recited in claim 1 having a margin between 9 and 11% of the drill diameter.

3. A drill as recited in claim 1 having a body clearance diameter between 94 and 96% of the drill diameter.

4. A drill as recited in claim 1 having a helix angle of from 20° to 40°.

5. A drill as recited in claim 4 having a margin between 9 and 11% of the drill diameter.

6. A drill as recited in claim 5 having a body clearance diameter between 94 and 96% of the drill diameter.

7. A drill as recited in claim 6 having a land width between 62 and 64% of the drill diameter.

8. A drill as recited in claim 1 having a web thickness of about 5/32 of the drill diameter.

9. A twist drill having a longitudinal axis, a relief surface extending through an arc of at least 30° about said axis, a point angle from 60° to 100°, and a lip relief angle for said relief surface from 1° to 5°.

10. A drill as recited in claim 9 having a helix angle of from 20° to 40°.

11. A drill as recited in claim 1 having a margin between 9 and 11% of the drill diameter.

12. A drill as recited in claim 10 having a body clearance diameter between 94 and 96% of the drill diameter.

13. A drill as recited in claim 1 having a land width between 62 and 64% of the drill diameter.

14. A drill as recited in claim 10 having a web thickness of 5/32 of the drill diameter.

15. A drill as recited in claim 9 having a margin between 9 and 11% of the drill diameter.

16. A drill as recited in claim 9 having a body clearance diameter between 94 and 96% of the drill diameter.

17. A drill as recited in claim 9 having a land width between 62 and 64% of the drill diameter.

18. A drill as recited in claim 9 having a web thickness of about 5/32 of the drill diameter.

19. A drill as recited in claim 9 having a diameter of one inch or less.

20. A drill as recited in claim 9 having a land width between 55 and 70% of the drill diameter.

21. A drill as recited in claim 9 having a helix angle from 24° to 30°.

22. A drill as recited in claim 9 having a helix angle of approximately 30°.

23. A drill as recited in claim 22 having a margin between 9 and 11% of the drill diameter.

24. A drill as recited in claim 23 having a body clearance diameter between 94 and 96% of the drill diameter.

25. A drill as recited in claim 24 having a land width between 62 and 64% of the drill diameter.

26. A drill as recited in claim 25 having a web thickness of about 5/32 of the drill diameter.

* * * * *